(12) United States Patent
Snowdon et al.

(10) Patent No.: US 10,920,912 B2
(45) Date of Patent: Feb. 16, 2021

(54) SACRIFICIAL SHIELDING (71) Applicant: BAKER HUGHES ENERGY TECHNOLOGY UK LIMITED, Bristol (GB)

(72) Inventors: Paul Snowdon, South Shields (GB); Ashley Clack, Newcastle Upton Tyne (GB)

(73) Assignee: Baker Hughes Energy Technology UK Limited, Bristol (GB)

( * ) Notice: Subject to any disclaimer, the term of this patent is extended or adjusted under 35 U.S.C. 154(b) by 47 days.

(21) Appl. No.: 16/310,618

(22) PCT Filed: Jun. 27, 2017

(86) PCT No.: PCT/GB2017/051867
§ 371 (c)(1),
(2) Date: Dec. 17, 2018

(87) PCT Pub. No.: WO2018/002599
PCT Pub. Date: Jan. 4, 2018

(65) Prior Publication Data
US 2019/0219199 A1 Jul. 18, 2019

(30) Foreign Application Priority Data

Jun. 30, 2016 (GB) .................................. 1611342.5

(51) Int. Cl.
*F16L 11/00* (2006.01)
*F16L 11/08* (2006.01)
(Continued)

(52) U.S. Cl.
CPC .............. *F16L 11/083* (2013.01); *B32B 1/08* (2013.01); *F16L 11/12* (2013.01); *B32B 2307/554* (2013.01)

(58) Field of Classification Search
CPC ................................ F16L 11/083; F16L 11/12
(Continued)

(56) References Cited

U.S. PATENT DOCUMENTS 846,996 A * 3/1907 Greenfield .............. F16L 11/16
138/131
1,145,434 A * 7/1915 Pechstein ................ F16L 11/16
138/131
(Continued)

FOREIGN PATENT DOCUMENTS

CN 102245953 11/2011
CN 104412020 3/2015
(Continued)

OTHER PUBLICATIONS

Helgaker, J.F. et al., "Large-Scale Erosion Testing of an Unbonded Flexible Pipe," 2016 SPE Journal.
(Continued)

*Primary Examiner* — James F Hook
(74) *Attorney, Agent, or Firm* — Knobbe, Martens, Olson & Bear, LLP (57) ABSTRACT

A method and apparatus are disclosed for providing erosion protection to self-interlocking windings of a carcass layer of a flexible pipe. The method includes the steps of, via a wound sacrificial insert located over at least a portion of an inner facing surface of self-interlocking windings of a carcass layer, shielding at least a flow facing edge region of each self-interlocking winding from abrasive elements carried by a bore fluid flowing along a bore of the flexible pipe from an upstream to a downstream location.

15 Claims, 10 Drawing Sheets (51) Int. Cl.
*B32B 1/08* (2006.01)
*F16L 11/12* (2006.01)

(58) Field of Classification Search
USPC .............................. 138/135, 136, 129, 138
See application file for complete search history.

(56) References Cited

U.S. PATENT DOCUMENTS

| | | | | |
|---|---|---|---|---|
| 3,204,666 | A * | 9/1965 | Lindsay | F16L 11/16 138/135 |
| 5,275,209 | A * | 1/1994 | Sugier | F16L 11/16 138/129 |
| 2003/0070719 | A1 * | 4/2003 | Espinasse | F16L 11/16 138/109 |
| 2004/0074553 | A1 * | 4/2004 | Espinasse | F16L 11/24 138/135 |
| 2011/0076477 | A1 * | 3/2011 | Brandstatter | C21D 8/0478 428/217 |
| 2011/0192485 | A1 * | 8/2011 | Graham | F16L 11/16 138/129 |
| 2015/0252920 | A1 * | 9/2015 | Farnes | F16L 11/083 138/135 |
| 2016/0069485 | A1 * | 3/2016 | Warnakulasuriya | B21C 37/126 138/129 |
| 2016/0069486 | A1 * | 3/2016 | Roberts | B21C 37/121 29/890.144 |
| 2017/0175933 | A1 * | 6/2017 | Secher | F16L 55/041 |

FOREIGN PATENT DOCUMENTS

| | | |
|---|---|---|
| FR | 3017438 | 8/2015 |
| FR | 3017439 | 8/2015 |
| WO | WO 2014/000816 | 1/2014 |
| WO | WO 2014/167346 | 10/2014 |
| WO | WO 2015/121316 | 8/2015 |
| WO | WO 2015/121424 | 8/2015 |

OTHER PUBLICATIONS

International Search Report and Written Opinion, re PCT Application No. PCT/GB2017/051867, dated Sep. 14, 2017.

* cited by examiner

FIG. 10

SACRIFICIAL SHIELDING

The present invention relates to the provision of erosion protection in flexible pipes. In particular, but not exclusively, the present invention relates to the use of a wound insert that is helically wound on the inside surface of a carcass layer of a flexible pipe to protect a whole or part of the carcass layer from possible erosion caused by fast moving abrasive particles carried in a transported bore fluid.

Traditionally flexible pipe is utilised to transport production fluids, such as oil and/or gas and/or water, from one location to another. Flexible pipe is particularly useful in connecting a sub-sea location (which may be deep underwater, say 1000 metres or more) to a sea level location. The pipe may have an internal diameter of typically up to around 0.6 metres (e.g. diameters may range from 0.05 m up to 0.6 m). Flexible pipe is generally formed as an assembly of flexible pipe body and one or more end fittings. The pipe body is typically formed as a combination of layered materials that form a pressure-containing conduit. The pipe structure allows large deflections without causing bending stresses that impair the pipe's functionality over its lifetime. There are different types of flexible pipe such as unbonded flexible pipe which is manufactured in accordance with API 17J or composite type flexible pipe or the like. The pipe body is generally built up as a combined structure including polymer layers and/or composite layers and/or metallic layers. For example, pipe body may include polymer and metal layers, or polymer and composite layers, or polymer, metal and composite layers. Layers may be formed from a single piece such as an extruded tube or by helically winding one or more wires at a desired pitch or by connecting together multiple discrete hoops that are arranged concentrically side-by-side. Depending upon the layers of the flexible pipe used and the type of flexible pipe some of the pipe layers may be bonded together or remain unbonded.

Some flexible pipe has been used for deep water (less than 3,300 feet (1,005.84 metres)) and ultra-deep water (greater than 3,300 feet) developments. It is the increasing demand for oil which is causing exploration to occur at greater and greater depths (for example in excess of 8202 feet (2500 metres)) where environmental factors are more extreme. For example in such deep and ultra-deep water environments ocean floor temperature increases the risk of production fluids cooling to a temperature that may lead to pipe blockage. In practice flexible pipe conventionally is designed to perform at operating temperatures of −30° C. to +130° C., and is being developed for even more extreme temperatures. Increased depths also increase the pressure associated with the environment in which the flexible pipe must operate. For example, a flexible pipe may be required to operate with external pressures ranging from 0.1 MPa to 30 MPa acting on the pipe. Equally, transporting oil, gas or water may well give rise to high pressures acting on the flexible pipe from within, for example with internal pressures ranging from zero to 140 MPa from bore fluid acting on the pipe. As a result the need for high levels of performance from certain layers such as a pipe carcass or the pressure armour and tensile armour layers of the flexible pipe body is increased. It is noted for the sake of completeness that flexible pipe may also be used for shallow water applications (for example less than around 500 metres depth) or even for shore (overland) applications.

A problem with certain conventional flexible pipes is that in use a fluid such as a liquid transported along a bore of the flexible pipe can, over time, erode an inner surface of the material of the windings of an innermost carcass layer of the flexible pipe. As a result the tapes used to form a carcass layer must be manufactured from specialist materials or have a thickness selected to have inbuilt redundancy. That is to say extra hard materials which are expensive must be used to avoid erosion or thicker tapes must be used initially so that at a predicted end of life of the flexible pipe the predicted remaining material still has sufficient thickness for a carcass layer to perform as needed. Alternatively where erosion characteristics of a fluid being transported have values that exceed a predicted value there is a risk that a carcass layer can be eroded and thus thinned in certain locations to a point where the flexible pipe may fail.

A further problem is that the windings of the carcass layer do not present an identical profile to oncoming fluid flow regardless of the direction of flow along the bore. In fact it has been observed that in certain regions erosion effects caused by flow along a flexible pipe bore in one direction will always exceed erosion effects with flow in an opposite direction. Typically a direction of intended use is not often specified when flexible pipe is manufactured and this can lead to unpredictable wear rates depending upon which direction of orientation a pipe is put into in service.

It is an aim of the present invention to at least partly mitigate one or more of the above-mentioned problems.

It is an aim of certain embodiments of the present invention to provide a carcass layer and a method of manufacturing a carcass layer in which a sacrificial insert can be wound simultaneously with carcass layer windings to help shield an inner surface wholly or at least in part from abrasive elements carried with a bore fluid.

It is an aim of certain embodiments of the present invention to provide protection for an inner surface of a carcass layer using materials and/or method of manufacture that is cost effective.

It is an aim of certain embodiments of the present invention to provide a carcass layer and a method of manufacturing a carcass layer that includes a sacrificial component that can be added at the point of manufacturing flexible pipe body which is otherwise predesigned to perform under certain operational characteristics when actual operating characteristics are subsequently determined to be different from those originally predicted. That is to say certain embodiments of the present invention aim to provide a "last minute" boost or 'top up' to the erosion resistance of a carcass layer.

It is an aim of certain embodiments of the present invention to provide a carcass layer that presents substantially common erosion vulnerability and erosion pattern regardless of the direction of primary bore fluid flow.

According to a first aspect of the present invention there is provided a method of providing erosion protection to self-interlocking windings of a carcass layer of a flexible pipe, comprising the steps of:

via a wound sacrificial insert located over at least a portion of an inner facing surface of self-interlocking windings of a carcass layer, shielding at least a flow facing edge region of each self-interlocking winding from abrasive elements carried by a bore fluid flowing along a bore of the flexible pipe from an upstream to a downstream location.

Aptly the method further comprises shielding the flow facing edge region via a wound sacrificial insert that comprises an elongate tape element, wound on an equal pitch with the self-interlocking windings of the carcass layer, that has a cross-section including a locating body portion at least partially locatable in a gap between adjacent self-interlocking windings, and an axially extending body portion, said step of shielding the flow facing edge region comprising covering the edge region with at least one of the locating body portion and/or the axially extending body portion.

Aptly the method further comprises shielding at least 80% of a whole of a radially inner surface of the carcass layer via the wound tape element.

Aptly the method further comprises shielding the flow facing edge region via a tape element that is a folded strip.

Aptly the method further comprises shielding the flow facing edge region via a folded strip that has a generally T-shaped cross-section, a central body portion of the cross-section of the tape element being located in a gap between the self-interlocked windings and a first and further wing portion of the cross-section on each side of the body portion being located to cover respective regions of adjacent carcass windings.

Aptly the method further comprises shielding a whole of a radially inner surface of the carcass layer via the folded strip whereby respective first and further wing portions of adjacent windings of the folded strip that extend axially towards one another and have wing tips that touch or at least partially overlap when the flexible pipe is in a non-bent state.

Aptly the method further comprises shielding the flow facing edge region via a folded strip that has a generally C-shaped cross-section, a central, generally flat body portion of the cross-section of the folded strip that comprises the axially extending body portion being located over a co-operating flat region of a self-interlocking winding of the carcass layer and arcuate ends of the cross-section of the folded strip being located over respective co-operating curved regions of said a self-interlocking winding.

Aptly the method further comprises shielding the flow facing edge region via a tape element that is an elongate moulded element or composite element.

Aptly the method further comprises shielding the flow facing edge region from abrasive elements carried by a liquid bore fluid or multi-phase bore fluid.

Aptly the method further comprises shielding via a tape element that comprises a hardened outer surface.

Aptly the method further comprises the hardened outer surface comprises a surface that has been flame hardened or cold rolled or shot peened.

According to a second aspect of the present invention there is provided flexible pipe body for a rough bore flexible pipe, comprising:
  a barrier layer; and
  a carcass layer comprising self-interlocked windings located radially inside the barrier layer; wherein
  a helically wound folded strip is wound at the same pitch as the self-interlocked windings, a cross-section of the folded strip comprising at least one locating body portion at least partially locatable in a gap between adjacent self-interlocked windings and at least one axially extending portion whereby at least one of the body portion and axially extending portion at least partially covers a flow facing edge region of each self-interlocked winding.

Aptly the folded strip has a generally T-shaped cross-section comprising a central body portion that comprises the locating body portion and a first and further wing portion that comprise said axially extending portion wherein the wing portions of adjacent folded strip windings extend axially towards one another and have wing tips that touch or at least partially overlap when the pipe is in a non-bent state.

Aptly the folded strip has a generally C-shaped cross-section comprising a central generally flat body portion, that comprises the locating body portion, located over a cooperating flat region of a self-interlocking winding of the carcass layer and arcuate ends, that comprise said axially extending portion, located over respective cooperating curved regions of said a self-interlocking winding.

According to a third aspect of the present invention there is provided use of a sacrificial insert helically wound within and at least partially between adjacent self-interlocking windings of a carcass layer of a flexible pipe to provide erosion protection to the carcass layer.

Aptly the use comprises providing the carcass layer with erosion protection from abrasive elements in a liquid bore fluid or a multi-phase bore fluid.

Aptly the use comprises use of a helically wound insert having a cross-section that comprises at least one body portion for locating in a gap between adjacent self-interlocking windings of the carcass layer and at least one axially extending portion whereby at least one of the body portion and axially extending portion locates at least partially over a flow facing edge region of each of said self-interlocking windings.

According to a fourth aspect of the present invention there is provided a carcass layer by helically winding an elongate carcass tape element over an underlying substantially cylindrical surface whereby adjacent windings of the elongate carcass tape element self-interlock; and
  simultaneously helically winding an elongate sacrificial insert at least partially in a gap between adjacent windings of the carcass tape element thereby covering a flow facing edge of each winding of the carcass tape element with at least a portion of the sacrificial insert of a respective insert winding.

Aptly the method comprises winding the sacrificial insert whereby tips of adjacent wing portions from adjacent windings of the sacrificial insert touch or at least partially overlap.

Aptly the method further comprises surface hardening the elongate carcass tape prior to winding.

Aptly the method further comprises surface hardening via a cold rolling or flame hardening or shot peening process.

According to a fifth aspect of the present invention there is provided apparatus constructed and arranged substantially as hereinbefore described with reference to the accompanying drawings.

According to a sixth aspect of the present invention there is provided a method substantially as hereinbefore described with reference to the accompanying drawings.

Certain embodiments of the present invention provide flexible pipe body including a carcass layer and a method for manufacturing such flexible pipe body in which a sacrificial insert can conveniently be located over a part or parts of the inner surface of the carcass layer to provide coverage and thus shielding protection to the carcass layer from abrasive elements such as particulate matter like sand carried in a transport fluid in a bore of the flexible pipe.

Certain embodiments of the present invention provide an insert which can be manufactured/formed from an initial flat strip in a convenient manner and which can thereafter be used to provide erosion protection for a carcass layer.

Certain embodiments of the present invention provide a way in which a helically wound insert can be utilised to help enhance erosion protection on the inner side of a bore of a flexible pipe. This is particularly useful when a flexible pipe is to be used in an environment when a transport fluid is initially or always or later in service expected to include highly abrasive elements which would otherwise be likely to cause failure of the flexible pipe prior to an expected end of life date.

Certain embodiments of the present invention utilise a helically wound insert on the inside of a carcass layer for a new purpose which is to provide erosion protection in flexible pipes where a helical winding insert between gaps of a carcass layer would otherwise not have been used.

Certain embodiments of the present invention provide a carcass layer that includes a sacrificial insert that helps present a similar surface profile to oncoming fluid flow regardless of bore fluid flow direction.

Certain embodiments of the present invention will now be described hereinafter, by way of example only, with reference to the accompanying drawings in which.

In the drawings like reference numerals refer to like parts.

Throughout this description, reference will be made to a flexible pipe. It is to be appreciated that certain embodiments of the present invention are applicable to use with a wide variety of flexible pipe. For example certain embodiments of the present invention can be used with respect to flexible pipe and associated end fittings of the type which is manufactured according to API 17J. Such flexible pipe is often referred to as unbonded flexible pipe. Likewise, certain other embodiments of the present invention are usable with flexible pipe and associated end fittings for flexible pipe of a composite type structure. Such composite type flexible pipe and its manufacture is currently being standardised by the API. Such flexible pipe can include adjacent tubular layers that are bonded together.

Figure 1:
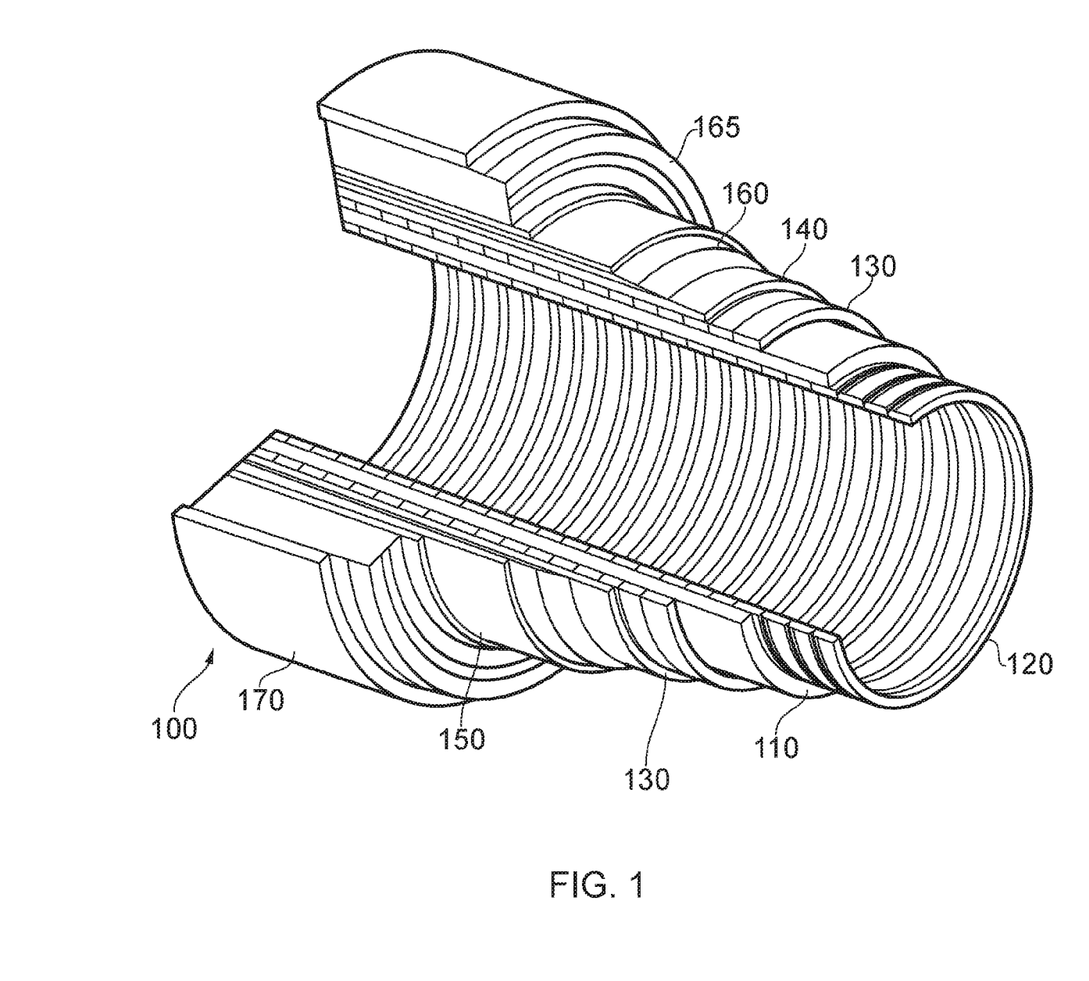
FIG. 1 illustrates flexible pipe body.

Turning to FIG. 1 it will be understood that the illustrated flexible pipe is an assembly of a portion of pipe body and one or more end fittings (not shown) in each of which a respective end of the pipe body is terminated. FIG. 1 illustrates how pipe body 100 is formed from a combination of layered materials that form a pressure-containing conduit. As noted above although a number of particular layers are illustrated in FIG. 1, it is to be understood that certain embodiments of the present invention are broadly applicable to coaxial pipe body structures including two or more layers manufactured from a variety of possible materials. The pipe body may include one or more layers comprising composite materials, forming a tubular composite layer. It is to be further noted that the layer thicknesses are shown for illustrative purposes only. As used herein, the term "composite" is used to broadly refer to a material that is formed from two or more different materials, for example a material formed from a matrix material and reinforcement fibres. Certain other possible examples are described herein below.

A tubular composite layer is thus a layer having a generally tubular shape formed of composite material. Alternatively a tubular composite layer is a layer having a generally tubular shape formed from multiple components one or more of which is formed of a composite material. The layer or any element of the composite layer may be manufactured via an extrusion, pultrusion or deposition process or, by a winding process in which adjacent windings of tape which themselves have a composite structure are consolidated together with adjacent windings. The composite material, regardless of manufacturing technique used, may optionally include a matrix or body of material having a first characteristic in which further elements having different physical characteristics are embedded. That is to say elongate fibres which are aligned to some extent or smaller fibres randomly orientated can be set into a main body or spheres or other regular or irregular shaped particles can be embedded in a matrix material, or a combination of more than one of the above. Aptly the matrix material is a thermoplastic material, aptly the thermoplastic material is polyethylene or polypropylene or nylon or PVC or PVDF or PFA or PEEK or PTFE or alloys of such materials with reinforcing fibres manufactured from one or more of glass, ceramic, basalt, carbon, carbon nanotubes, polyester, nylon, aramid, steel, nickel alloy, titanium alloy, aluminium alloy or the like or fillers manufactured from glass, ceramic, carbon, metals, buckminsterfullerenes, metal silicates, carbides, carbonates, oxides or the like.

The pipe body 100 illustrated in FIG. 1 includes an internal pressure sheath 110 which acts as a fluid retaining layer and comprises a polymer layer that ensures internal fluid integrity. The layer provides a boundary for any conveyed fluid. It is to be understood that this layer may itself comprise a number of sub-layers. It will be appreciated that when a carcass layer 120 is utilised the internal pressure sheath is often referred to by those skilled in the art as a barrier layer. In operation without such a carcass (so-called smooth bore operation) the internal pressure sheath may be referred to as a liner. A barrier layer 110 is illustrated in FIG. 1.

It is noted that a carcass layer 120 is a pressure resistant layer that provides an interlocked construction that can be used as the innermost layer to prevent, totally or partially, collapse of the internal pressure sheath 110 due to pipe decompression, external pressure, and tensile armour pressure and mechanical crushing loads. The carcass is a crush resistant layer. It will be appreciated that certain embodiments of the present invention are thus applicable to 'rough bore' applications (with a carcass). Aptly the carcass layer is a metallic layer. Aptly the carcass layer is formed from stainless steel, corrosion resistant nickel alloy or the like. Aptly the carcass layer is formed from a composite, polymer, or other material, or a combination of materials and components. A carcass layer is radially within the barrier layer.

A pressure armour layer 130 is a pressure resistant layer that provides a structural layer that increases the resistance of the flexible pipe to internal and external pressure and mechanical crushing loads. The layer also structurally supports the internal pressure sheath. Aptly as illustrated in FIG. 1 the pressure armour layer is formed as a tubular layer. Aptly for unbonded type flexible pipe the pressure armour layer consists of an interlocked construction of wires with a lay angle close to 90°. Aptly in this case the pressure armour layer is a metallic layer. Aptly the pressure armour layer is formed from carbon steel, aluminium alloy or the like. Aptly the pressure armour layer is formed from a pultruded composite interlocking layer. Aptly the pressure armour layer is formed from a composite formed by extrusion or pultrusion or deposition. A pressure armour layer is radially outside an underlying barrier layer or liner.

The flexible pipe body also includes an optional first tensile armour layer 140 and optional second tensile armour layer 150. Each tensile armour layer is used to sustain tensile loads and optionally also internal pressure. Aptly for some flexible pipes the tensile armour windings are metal (for example steel, stainless steel or titanium or the like). For some composite flexible pipes the tensile armour windings may be polymer composite tape windings (for example provided with either thermoplastic, for instance nylon, matrix composite or thermoset, for instance epoxy, matrix composite). For unbonded flexible pipe the tensile armour layer is typically formed from a plurality of wires. (To impart strength to the layer) that are located over an inner layer and are helically wound along the length of the pipe at a lay angle typically between about 10° to 55°. Aptly the tensile armour layers are counter-wound in pairs. Aptly the tensile armour layers are metallic layers. Aptly the tensile armour layers are formed from carbon steel, stainless steel, titanium alloy, aluminium alloy or the like. Aptly the tensile armour layers are formed from a composite, polymer, or other material, or a combination of materials.

Aptly the flexible pipe body includes optional layers of tape 160 which help contain underlying layers and to some extent prevent abrasion between adjacent layers. The tape layer may optionally be a polymer or composite or a combination of materials, also optionally comprising a tubular composite layer. Tape layers can be used to help prevent metal-to-metal contact to help prevent wear. Tape layers over tensile armours can also help prevent "birdcaging".

The flexible pipe body also includes optional layers of insulation 165 and an outer sheath 170, which comprises a polymer layer used to protect the pipe against penetration of seawater and other external environments, corrosion, abrasion and mechanical damage. Any thermal insulation layer helps limit heat loss through the pipe wall to the surrounding environment.

Each flexible pipe comprises at least one portion, referred to as a segment or section, of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
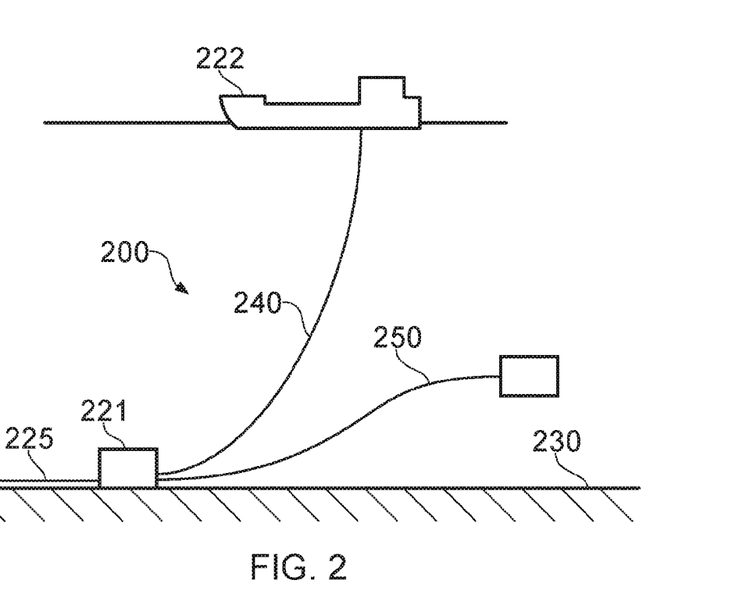
FIG. 2 illustrates uses of a flexible pipe.

FIG. 2 illustrates a riser assembly 200 suitable for transporting production fluid such as oil and/or gas and/or water from a sub-sea location 221 to a floating facility 222. For example, in FIG. 2 the sub-sea location 221 includes a sub-sea flow line 225. The flexible flow line 225 comprises a flexible pipe, wholly or in part, resting on the sea floor 230 or buried below the sea floor and used in a static application. The floating facility may be provided by a platform and/or buoy or, as illustrated in FIG. 2, a ship. The riser assembly 200 is provided as a flexible riser, that is to say a flexible pipe 240 connecting the ship to the sea floor installation. The flexible pipe may be in segments of flexible pipe body with connecting end fittings.

It will be appreciated that there are different types of riser, as is well-known by those skilled in the art. Certain embodiments of the present invention may be used with any type of riser, such as a freely suspended (free-hanging, catenary riser), a riser restrained to some extent (buoys, chains), totally restrained riser or enclosed in a tube (I or J tubes). Some, though not all, examples of such configurations can be found in API 17J. FIG. 2 also illustrates how portions of flexible pipe can be utilised as a jumper 250.

Figure 3:
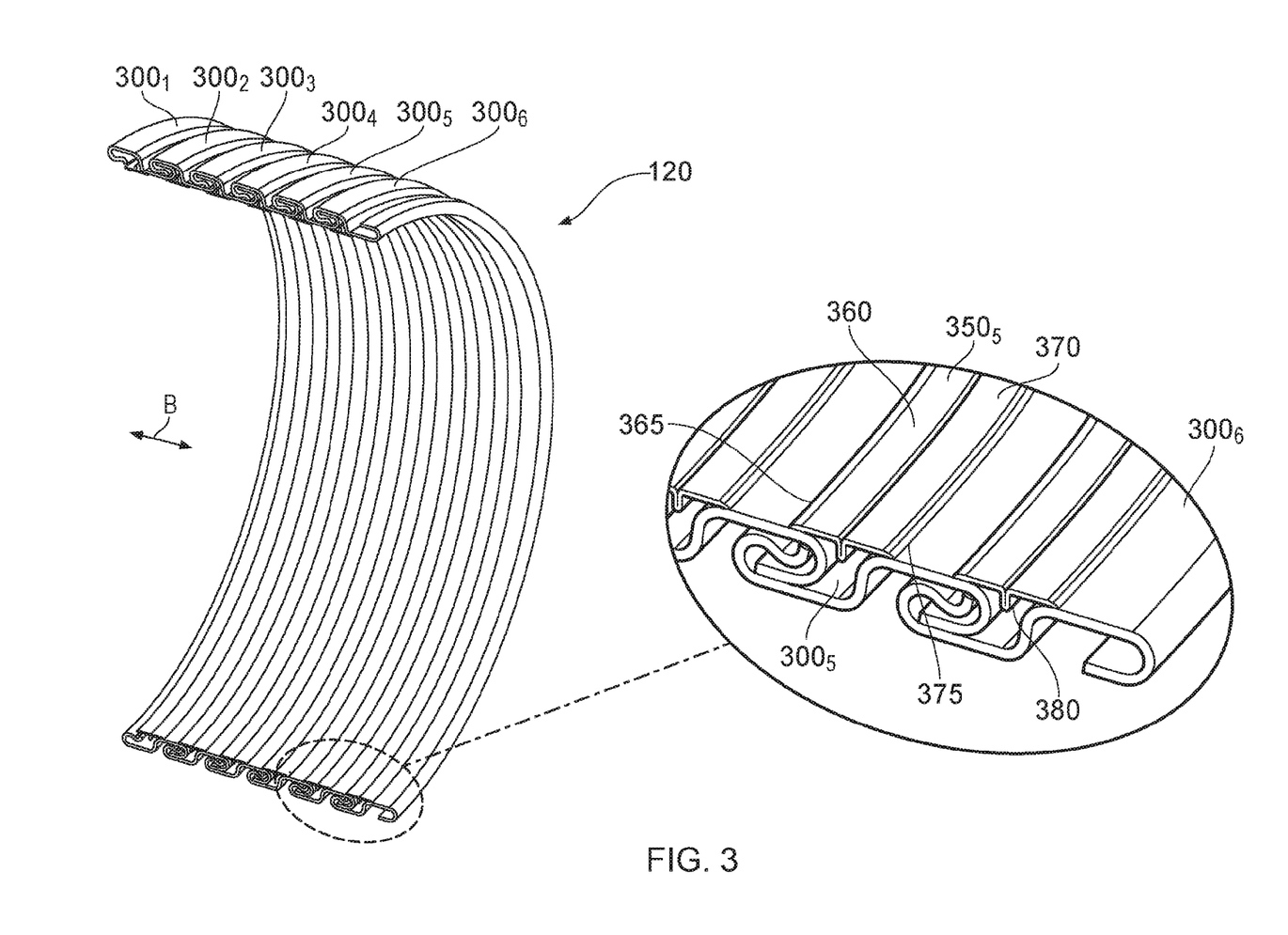
FIG. 3 illustrates a carcass layer.

FIG. 3 illustrates the carcass layer 120 in more detail. As shown in FIG. 3 the carcass layer is a generally tubular structure formed by self-interlocked windings of a elongate tape having a generally S-shaped cross-section. Each winding $300_{1-6}$ is formed from a folded strip and is manufactured by winding the profile strip over an underlying substantially cylindrical layer whereby each new winding will self-interlock with an immediately preceding winding. In this way each winding forms an effective hoop which resists collapse pressures exerted externally on a flexible pipe.

FIG. 3 also helps illustrate how a sacrificial insert 350 can be wound on the radially inner surface of the windings of the carcass layer. As illustrated in FIG. 3 the sacrificial insert is formed from a folded strip having a generally T-shaped cross-section. It will be appreciated that certain other embodiments of the present invention provide a sacrificial insert wound between adjacent carcass windings that have other cross-sections and that are formed other than from folded strip. For example, as described hereinafter, the sacrificial insert may have a C-shape. Alternatively, moulded or composite bodies may be wound as a sacrificial insert. As shown in FIG. 3, the insert 350 has a cross-section which includes a first wing portion 360 which ends to a tip 365 formed from an edge of the folded strip and a further wing portion 370 which likewise has a tip 375 formed from another edge of the folded strip. At the centre of the cross-section of the insert strip is a generally U-shaped body portion 380 which extends radially outwardly away from the central bore B formed by the carcass layer and barrier layer. In use, as the flexible pipe body, which includes the carcass layer 120, bends and flexes the windings move nearer and further apart depending upon their position with respect to a bending site. The body portion 380 of the sacrificial insert helps keep the insert duly located with respect to the adjacent windings of the carcass tape where the sacrificial insert winding is positioned.

Figure 4:
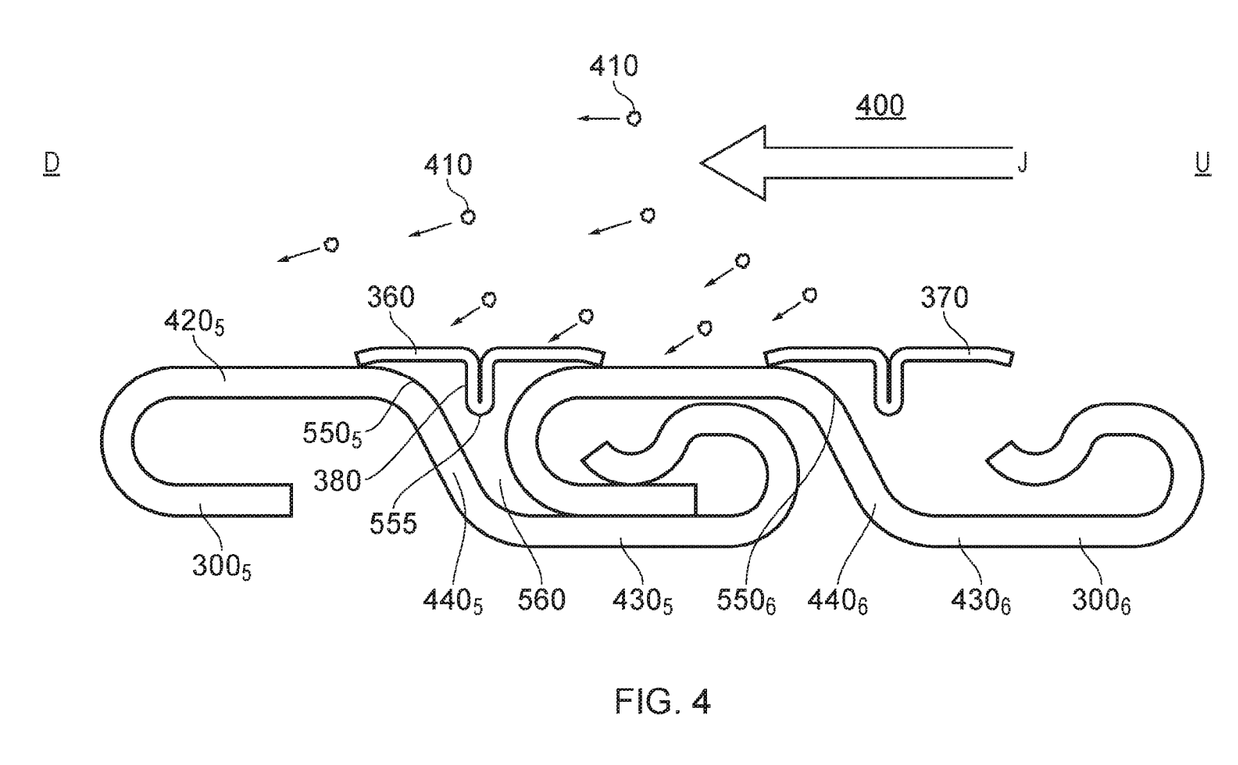
FIG. 4 illustrates a closer view of two windings of a carcass layer with a wound insert.

FIG. 4 illustrates a closer view of two carcass windings $300_6$, $300_5$ and illustrates how a flow of liquid bore fluid 400 flowing in a direction J illustrated by the arrow in FIG. 4 flows past the radially inner surface provided by the carcass layer windings and the insert windings. As illustrated in FIG. 4 the liquid bore fluid 400 includes multiple abrasive particles 410 and the small arrows shown generally indicate how those abrasive particles, such as sand particles, which are entrained and carried in the bore fluid flow can provide high velocity bombardment of the radially inner surface of the carcass layer.

In more detail FIG. 4 helps illustrate the generally S-shaped cross-section of each carcass winding in more detail. The carcass windings are self-interlocking. That is to say, each winding interlocks with an adjacent winding without a further component being required to lock the elements so that they cannot be separated. Each carcass winding includes a substantially planar radially inner portion 420 and a substantially planar radially outer portion $430_5$. The inner and outer planar parts of each carcass winding are joined together by a central connecting portion 440 of the carcass winding strip.

FIG. 4 helps illustrate how a flow facing edge surface 550 of each carcass winding generally faces the flow of liquid in the bore of the flexible pipe which flows from an upstream location U to a downstream location D. Furthermore, FIG. 4 helps illustrate how the generally U-shaped body 380 of the sacrificial insert which has an end 555 generally sits in a recess 560 between adjacent windings of the carcass layer. The wings 360, 370 and body portion 380 of the insert winding shield the flow facing edge of the carcass winding so that abrasive elements in the bore liquid do not effectively "sandblast" the carcass layer and thus erode it. Over time the sacrificial insert will be eroded and in this sense it is sacrificial.

FIG. 4 thus helps illustrate use of a sacrificial insert helically wound within, and at least partially between, adjacent self-interlocking windings of a carcass layer of a flexible pipe to provide erosion protection to the carcass layer. Aptly use of such a sacrificial layer is made for providing the carcass layer with erosion protection from abrasive elements in a liquid bore fluid. Inserts covering gaps on the inside of a carcass layer have not been previously utilised with liquid phase base fluid transportation. Aptly a cross-section of the sacrificial insert includes a portion which, when the insert is duly located, will protect at least a flow facing edge of each winding of the carcass layer. Such a region would otherwise bear the brunt of the energy and erosive capability of particulate matter in the bore liquid.

Figure 5A:
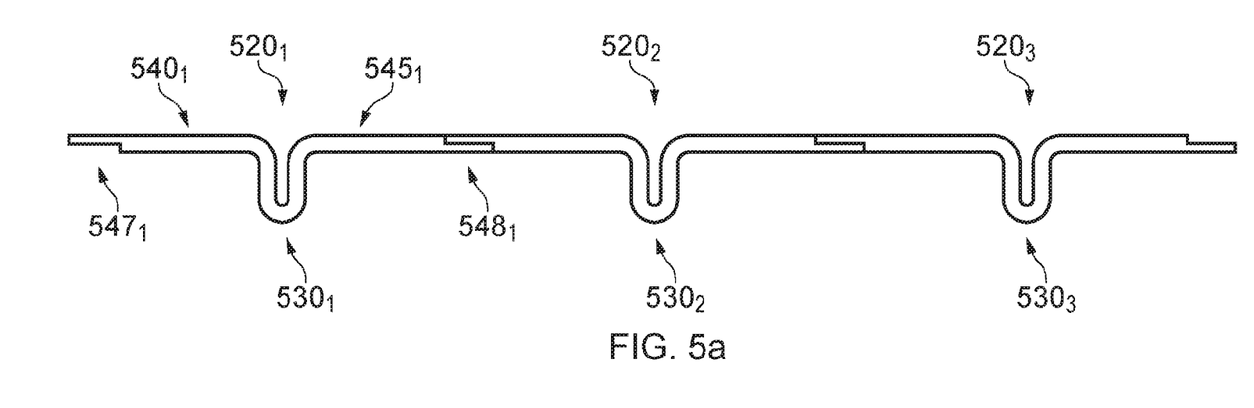
FIG. 5 illustrates alternative insert windings.
Figure 5B:
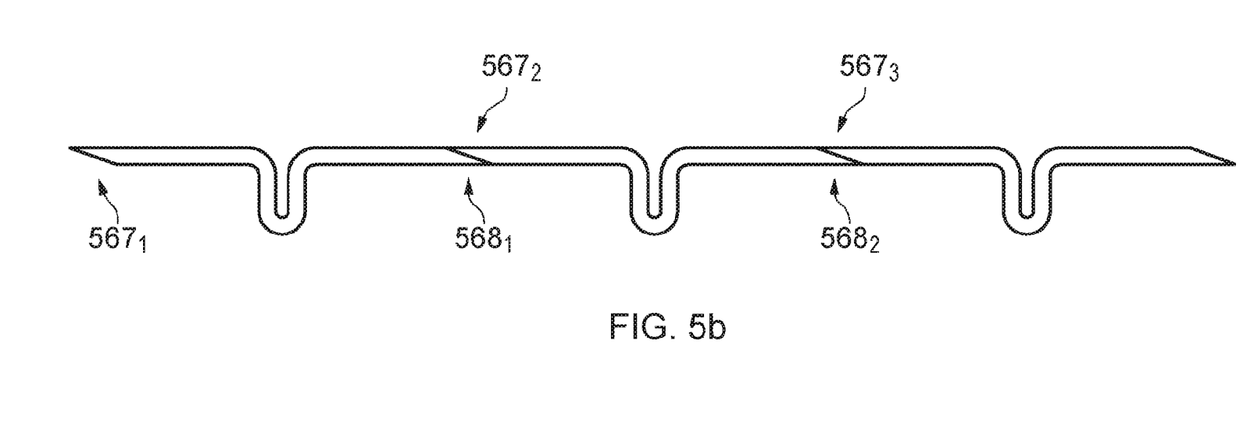

FIGS. 5a and 5b help illustrate a cross-section of alternative sacrificial inserts according to certain other embodiments of the present invention. Both FIGS. 5a and 5b illustrate a sacrificial insert having a cross-section configured to include wing portions that at least touch or at least partially overlap with wing portions from adjacent windings. In this way an entire radially inside surface of a carcass layer can be protected by shielding the inner surface from erosive particles in a bore fluid. In more detail FIG. 5a illustrates three adjacent windings $520_1$, $520_2$, $520_3$ which each include a centrally U-shaped body portion $530_1$, $530_2$, $530_3$. Each winding has a generally T-shaped cross-section and can be formed from an initial flat strip which then has three, easy to manufacture (and thus inexpensive), folds made in it to form the cross-section shown. The tips at the end of the wings 540, 545 are pre-shaped to nest together. That is to say, as illustrated in FIG. 5a, a first winding $520_1$ includes a left hand side (shown in the FIG. 5a) wing $540_1$ and a right hand side further wing $545_1$. The two wings face away from each other and away from the central body part of the cross-section. A wing tip $547_1$ of the first wing $540_1$ has a downward facing generally rectangular recess. The wing tip $548_1$ at the end of the further wing $545_1$ has an upwardly facing generally rectangular recess. In this way as adjacent windings of the sacrificial insert are wound a leading wing tip of an incoming winding nests in a cooperating recess of a trailing wing tip of a trailing wing portion of a preceding winding. FIG. 5b helps illustrate how, as an alternative, instead of the rectangular recess illustrated with FIG. 5a each wing tip 567, 568 is angled so as to help nest with a cooperating angle part of a wing tip of an adjacent winding. Other nesting shapes at the wing tips could of course be utilised. Likewise if the thickness of the strip that forms the sacrificial insert is thin the wing tip of one insert winding may overlie another without any recess being necessary.

Figure 6:
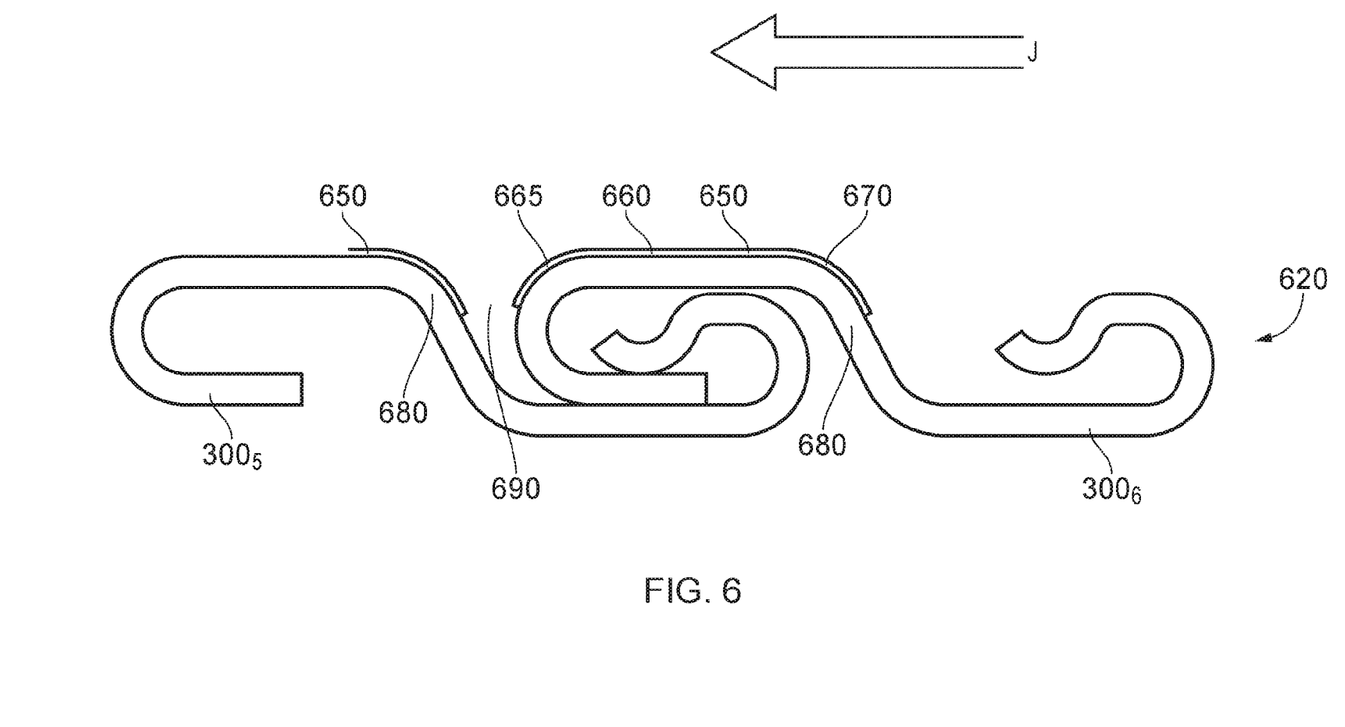
FIG. 6 illustrates an alternative wound insert cross-section.

FIG. 6 illustrates a close view of two carcass windings $300_6$, $300_5$ in an alternative carcass layer 620 in more detail. The carcass layer is a generally tubular structure formed by self-interlocked windings of an elongate tape having a generally S-shaped cross-section. FIG. 6 illustrates how a sacrificial insert 650 can be wound on the radially inner surface of the carcass layer. As illustrated in FIG. 6 the sacrificial insert is formed from a folded strip having a generally C-shaped cross-section. The folded strip that forms the insert is a long tape that can be wound helically along with the strip that forms the carcass layer. As shown in FIG. 6 the insert 650 has a cross-section which includes an axially extending central body portion 660 and, at each end, a curved locating body portion. A first curved end 665 is illustrated at the left hand side of FIG. 6 whilst a spaced apart curved locating body part 670 is shown on the right hand side of the cross-section in FIG. 6 as a second curved end 670. Each curved end of the cross-section of the tape has a curve selected to cooperate with a respective curve on the radially inner surface of the carcass layer winding. Each end of the generally C-shaped cross-section thus acts to locate the sacrificial insert 660 with respect to a specific region of an associated carcass layer winding. The locating body ends thus help locate the sacrificial insert winding with respect to a specific winding of the carcass layer. The central flat part of the sacrificial insert 660 shields a region of a carcass layer winding covered by the centre part of the sacrificial insert. Likewise each end which is curved to help duly locate and maintain the sacrificial insert in position shields a respective duly covered region of a carcass tape winding. In this way at least a flow facing edge region 680 of each self-interlocking winding of a carcass layer is shielded from erosion caused by particular matter in a bore fluid, such as a liquid, by virtue of the sacrificial insert wound on a common pitch with each carcass layer winding. The cross-section of the sacrificial insert is such that it can be conveniently, and thus inexpensively, manufactured by beginning with a flat strip which has edges which ultimately form the tips of the cross-section of the sacrificial insert and in which two folds are made to provide the curvaceous shape 660 illustrated in FIG. 6. The curved ends of the C-shaped sacrificial insert closely conform to the curved edges of a carcass layer winding and thus are locatable in a gap 690 between adjacent self-interlocking windings. Utilising the sacrificial insert 660 illustrated in FIG. 6 means that almost an entire inner surface of a carcass layer can be shielded via the wound sacrificial insert. Only a small opening between adjacent tips at the ends of adjacent windings of the sacrificial insert allows any penetration of particles in the bore fluid to reach the radially inner surface of the carcass layer windings. Such an opening is placed "deep" into the depth of the carcass layer where any fluid velocities are likely to be low or negligible. As a result erosion effects are minimal.

As noted above, whilst certain embodiments of the present invention have been described and which make use of a folded strip to provide a sacrificial insert, it will be appreciated that certain other embodiments of the present invention can utilise moulded sacrificial inserts to provide a tape element which can be wound with a carcass layer windings and which can be duly located at a selected location with respect to carcass layer windings to at least partially shield regions of the carcass layer where maximum erosion would otherwise be expected to take place.

It will likewise be appreciated that certain embodiments of the present invention, including but not limited to the embodiments described with respect to FIGS. 3, 4, 5a and 5b, help ensure that the surface profile exposed to fluids flowing along the bore of the flexible pipe is the same regardless of flow direction. This helps provide predictability of erosion regardless of the orientation of the pipe when it is put into service.

Certain embodiments of the present invention provide erosion protection to the inner surface of the primary windings of a carcass layer. A variety of testing and/or modelling techniques can be used to show the beneficial effects of the use of a sacrificial insert. For example, such erosion characteristics can be measured and tested according to the testing procedure disclosed in "Large-Scale Erosion Testing of an Unbonded Flexible Pipe": J. F. Helgaker, DNV GL Oil & Gas; S Ijzermans, Woodside Energy; and T. J. Landheim, T. B. Eeg, S. N. Hverven, and P. Piotrowski, DNV GL Oil & Gas, Copyright © 2016 Society of Petroleum Engineers, 2016 SPE Journal. Using such testing procedures as well as microscopy measurements erosion rates for the primary carcass windings themselves when incorporating sacrificial strips used as shielding elements can be calculated.

Figure 7:
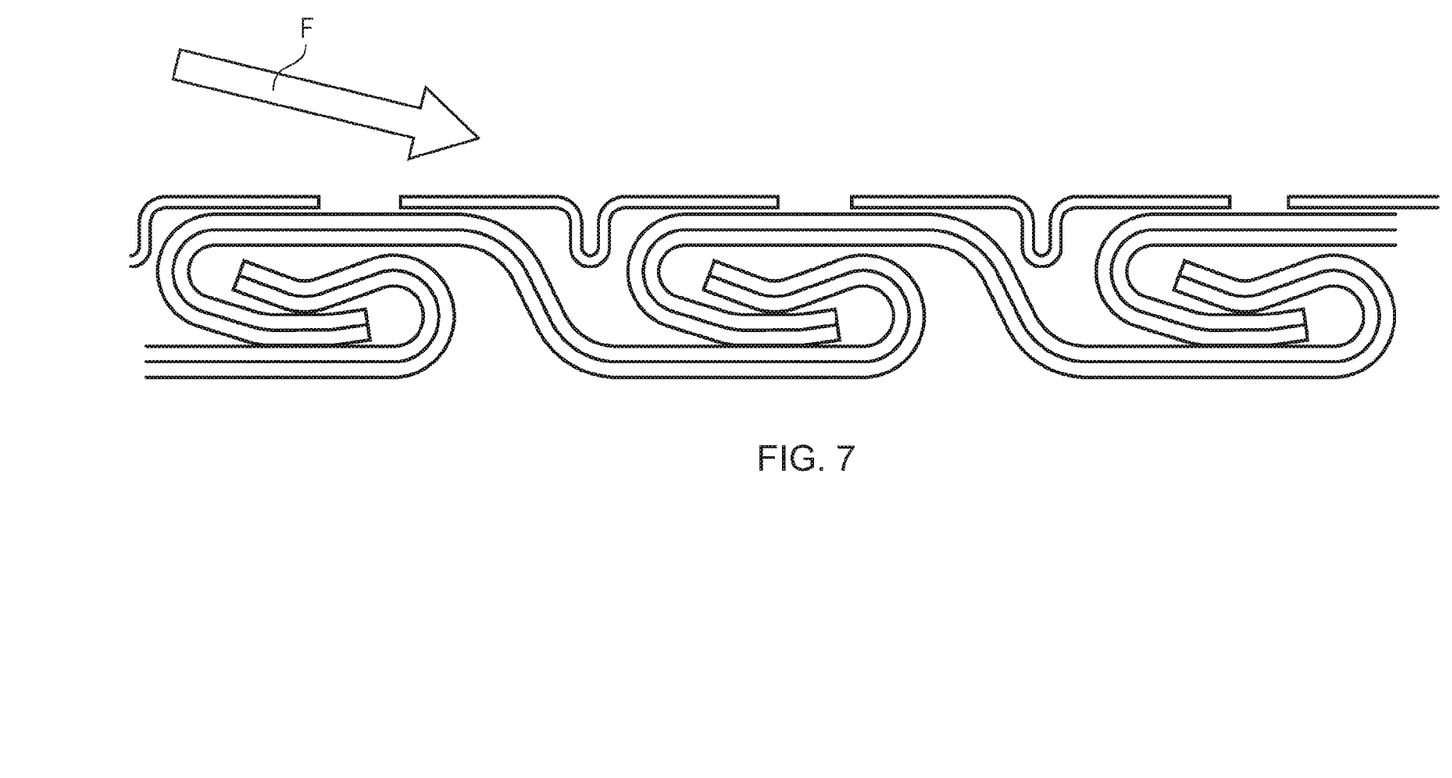
FIG. 7 illustrates thicknesses of the primary carcass windings and insert windings prior to erosion.

FIG. 7 helps illustrate the cross sectional thickness and relative position of a carcass layer including primary carcass windings and insert windings in more detail. The Figure shows the carcass layer at an initial point in time with a direction of flow along the bore illustrated via arrow F.

Figure 8:
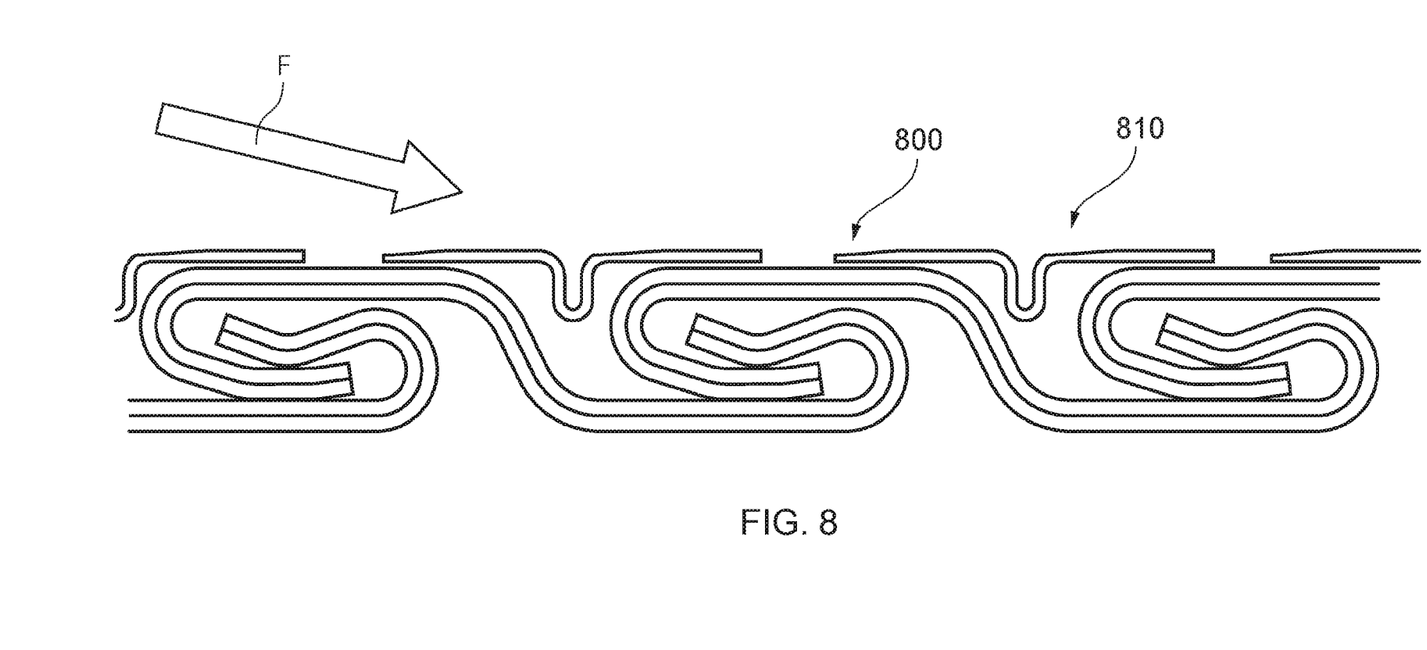
FIG. 8 illustrates how material loss caused by erosion is confined to areas of a T-insert.

FIG. 8 helps illustrate how leading edge regions of the insert are eroded after prolonged exposure to a sand carrying bore fluid. The tip region 800 of the leading wing and leading curved region 810 extending from the central body of the insert towards a remaining wing tip shows significant thinning. This corresponds to material loss caused by erosion. As shown in FIG. 8 material loss is confined to regions of the insert. The material of the primary windings of the carcass layer does not suffer material loss. Exposed material of the carcass windings is generally tangential to a main vector associated with bore fluid flow. Therefore such areas experience little or no impact/abrasive forces. Such exposed areas could of course be shielded via the embodiments of FIGS. 5a and 5b.

Figure 9:
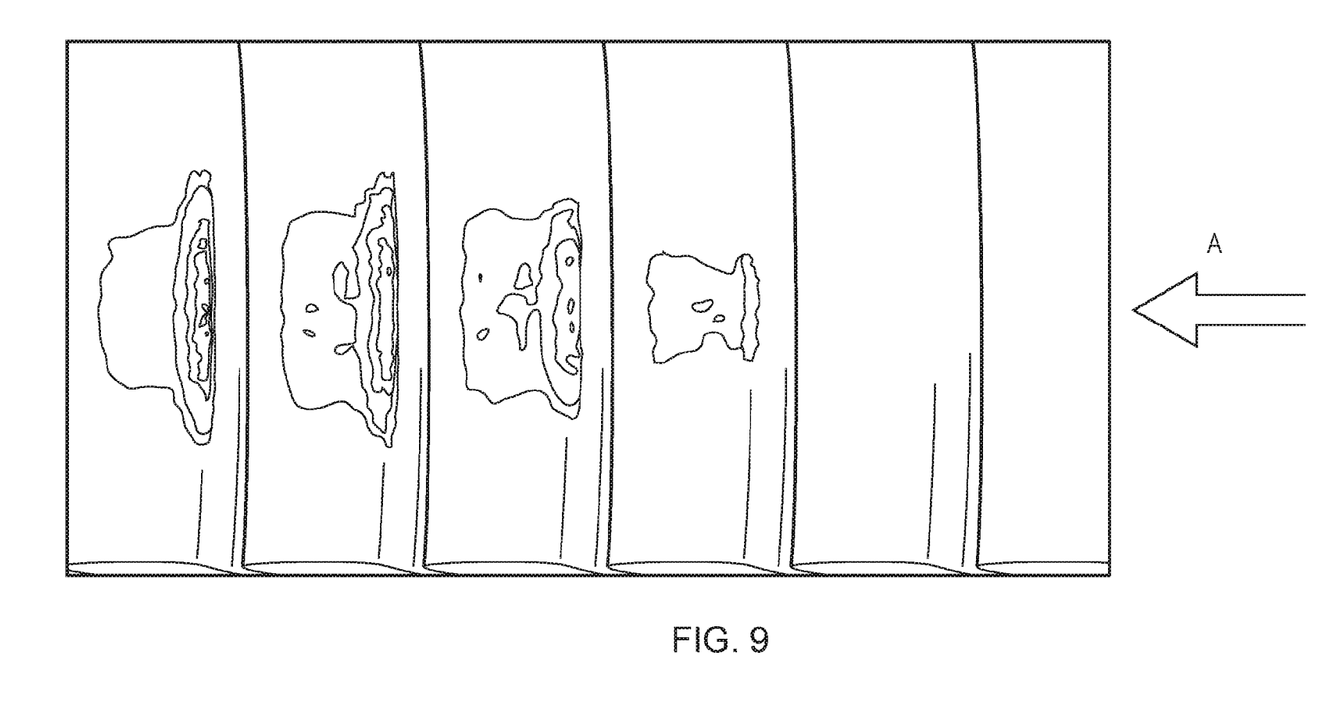
FIG. 9 illustrates carcass erosion without an insert with pipe bore flow in a first direction.
Figure 10:
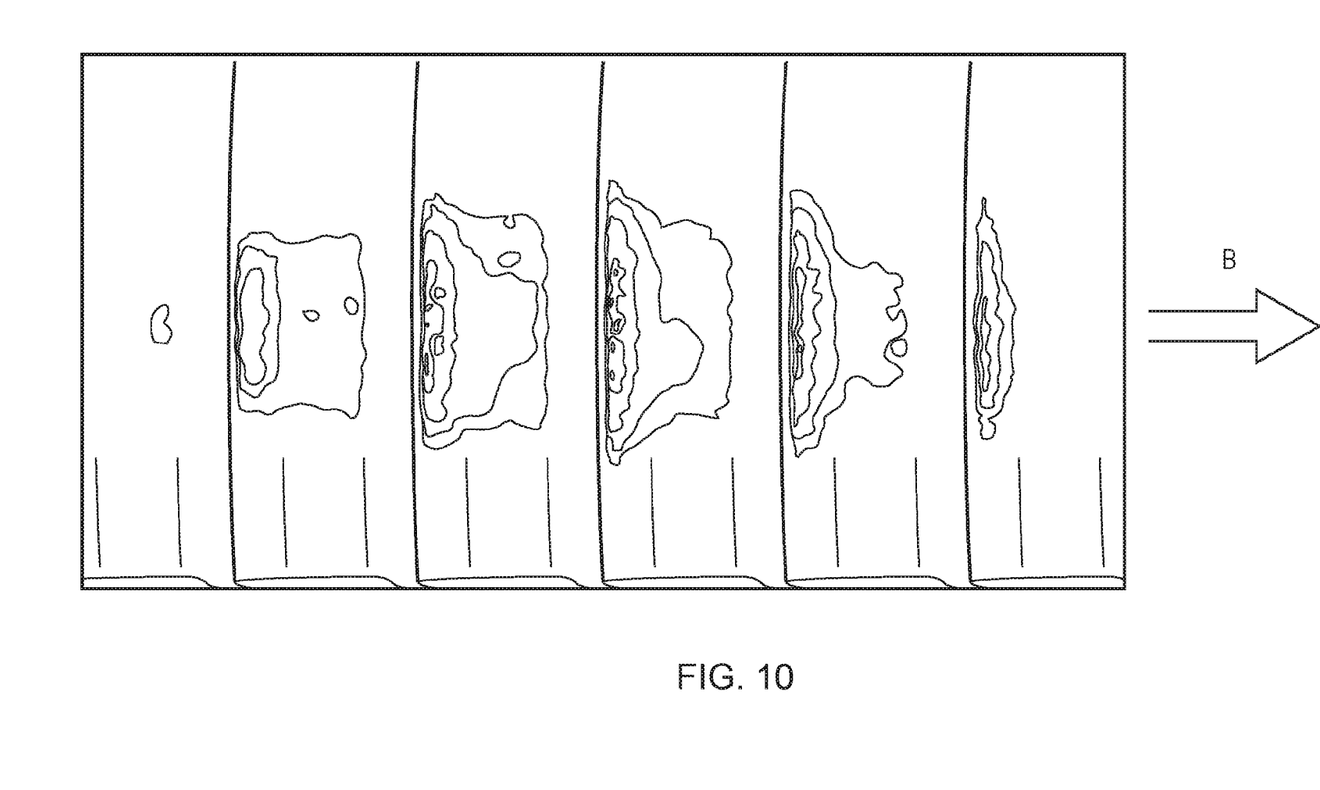
FIG. 10 illustrates carcass erosion without an insert with pipe bore flow in a further direction opposite to the first direction shown in FIG. 9.

FIG. 9 helps illustrate regions of high to low material loss on the primary windings of a carcass layer after a 20 m/s flow of bore fluid holding 25 micron diameter sand particles in direction A. This is with no insert in place. FIG. 10 shows the same effect but with the flow along the bore in an opposite direction. These Figures help illustrate how, without an insert according to certain embodiments of the present invention, material loss from the primary carcass windings is direction dependent. The symmetric nature of the inserts according to certain embodiments of the present invention helps overcome this problem and make the pipe flow direction independent.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of providing erosion protection to self-interlocking windings of a carcass layer of a flexible pipe, comprising the steps of:
   via a wound sacrificial insert located over at least a portion of an inner facing surface of self-interlocking windings of a carcass layer, shielding via a folded strip at least a flow facing edge region of each self-interlocking winding from abrasive elements carried by a bore fluid flowing along a bore of the flexible pipe from an upstream to a downstream location;
   wherein the folded strip has a generally C-shaped cross-section, a central, generally flat body portion of the cross-section of the folded strip that comprises an axially extending body portion being located over a cooperating flat region of a self-interlocking winding of the carcass layer and arcuate ends of the cross-section of the folded strip being located over respective cooperating curved regions of said a self-interlocking winding.

2. The method as claimed in claim 1, further comprising:
   shielding the flow facing edge region from abrasive elements carried by a liquid bore fluid or multi-phase bore fluid.

3. The method as claimed in claim 1, further comprising:
   shielding the flow facing edge region via a wound sacrificial insert that comprises an elongate tape element, wound on an equal pitch with the self-interlocking windings of the carcass layer, that has a cross-section including a locating body portion at least partially locatable in a gap between adjacent self-interlocking windings, and the axially extending body portion, said step of shielding the flow facing edge region comprising covering the edge region with at least one of the locating body portion and/or the axially extending body portion.

4. The method as claimed in claim 3, further comprising:
   shielding at least 80% of a whole of a radially inner surface of the carcass layer via the wound tape element.

5. The method as claimed in claim 3, further comprising:
   shielding the flow facing edge region via a tape element that is a folded strip.

6. The method as claimed in claim 3, further comprising:
   shielding the flow facing edge region via a tape element that is an elongate moulded element or composite element.

7. The method as claimed in claim 3, further comprising:
   shielding via a tape element that comprises a hardened outer surface.

8. The method as claimed in claim 7, further comprising:
   the hardened outer surface comprises a surface that has been flame hardened or cold rolled or shot peened.

9. Flexible pipe body for a rough bore flexible pipe, comprising:
   a barrier layer; and
   a carcass layer comprising self-interlocked windings located radially inside the barrier layer; wherein
   a helically wound folded strip is wound at the same pitch as the self-interlocked windings, a cross-section of the folded strip comprising at least one locating body portion at least partially locatable in a gap between adjacent self-interlocked windings and at least one axially extending portion whereby at least one of the body portion and axially extending portion at least partially covers a flow facing edge region of each self-interlocked winding;

wherein the folded strip has a generally C-shaped cross-section comprising a central generally flat body portion, that comprises the locating body portion, located over a cooperating flat region of a self-interlocking winding of the carcass layer and arcuate ends, that comprise said axially extending portion, located over respective cooperating curved regions of said a self-interlocking winding.

10. Use of a sacrificial insert helically wound within and at least partially between adjacent self-interlocking windings of a carcass layer of a flexible pipe to provide erosion protection to the carcass layer;

wherein the sacrificial insert comprises a helically wound folded strip wound at the same pitch as the self-interlocked windings, a cross-section of the folded strip comprising at least one locating body portion at least partially locatable in a gap between adjacent self-interlocked windings and at least one axially extending portion whereby at least one of the body portion and axially extending portion at least partially covers a flow facing edge region of each self-interlocked winding; and wherein the folded strip has a generally C-shaped cross-section comprising a central generally flat body portion, that comprises the locating body portion, located over a cooperating flat region of a self-interlocking winding of the carcass layer and arcuate ends, that comprise said axially extending portion, located over respective cooperating curved regions of said a self-interlocking winding.

11. The use as claimed in claim 10, further comprising:
providing the carcass layer with erosion protection from abrasive elements in a liquid bore fluid or a multi-phase bore fluid.

12. The use as claimed in claim 10, further comprising:
use of a helically wound insert having a cross-section that comprises at least one body portion for locating in a gap between adjacent self-interlocking windings of the carcass layer and at least one axially extending portion whereby at least one of the body portion and axially extending portion locates at least partially over a flow facing edge region of each of said self-interlocking windings.

13. A method of manufacturing flexible pipe body, comprising the steps of:
providing a carcass layer by helically winding an elongate carcass tape element over an underlying substantially cylindrical surface whereby adjacent windings of the elongate carcass tape element self-interlock; and simultaneously helically winding an elongate sacrificial insert at least partially in a gap between adjacent self-interlocked windings of the carcass tape element thereby covering a flow facing edge of each winding of the carcass tape element with at least a portion of the sacrificial insert of a respective insert winding;

wherein the sacrificial insert comprises a helically wound folded strip wound at the same pitch as the self-interlocked windings, a cross-section of the folded strip comprising at least one locating body portion at least partially locatable in a gap between adjacent self-interlocked windings and at least one axially extending portion whereby at least one of the body portion and axially extending portion at least partially covers a flow facing edge region of each self-interlocked winding; and wherein the folded strip has a generally C-shaped cross-section comprising a central generally flat body portion, that comprises the locating body portion, located over a cooperating flat region of a self-interlocking winding of the carcass layer and arcuate ends, that comprise said axially extending portion, located over respective cooperating curved regions of said a self-interlocking winding.

14. The method as claimed in claim 13, further comprising:
surface hardening the elongate carcass tape prior to winding.

15. The method as claimed in claim 14, further comprising:
surface hardening via a cold rolling or flame hardening or shot peening process.

* * * * *